United States Patent
Cancro et al.

(10) Patent No.: US 9,076,157 B2
(45) Date of Patent: Jul. 7, 2015

(54) CAMERA TIME OUT FEATURE FOR CUSTOMER PRODUCT SCANNING DEVICE

(71) Applicant: Wal-Mart Stores, Inc., Bentonville, AR (US)

(72) Inventors: Richard Neil Cancro, Portland, OR (US); Douglas James Pedley, Portland, OR (US); Joel Bennett Acker, Jr., Brush Prairie, WA (US)

(73) Assignee: WAL-MART STORES, INC., Bentonville, AK (US)

( * ) Notice: Subject to any disclaimer, the term of this patent is extended or adjusted under 35 U.S.C. 154(b) by 128 days.

(21) Appl. No.: 13/754,707

(22) Filed: Jan. 30, 2013

(65) Prior Publication Data

US 2014/0209687 A1 Jul. 31, 2014

(51) Int. Cl.
*G06K 7/10* (2006.01)
*G06Q 30/02* (2012.01)

(52) U.S. Cl.
CPC ..................................... *G06Q 30/02* (2013.01)

(58) Field of Classification Search
USPC ........................................ 235/462.01–462.49
See application file for complete search history.

(56) References Cited

U.S. PATENT DOCUMENTS

| | | | | | |
|---|---|---|---|---|---|
| 4,323,772 | A | * | 4/1982 | Serge | 235/462.19 |
| 4,877,949 | A | * | 10/1989 | Danielson et al. | 235/462.21 |
| 2006/0259314 | A1 | * | 11/2006 | Furman et al. | 705/1 |
| 2007/0057067 | A1 | * | 3/2007 | He | 235/462.45 |
| 2007/0080230 | A1 | * | 4/2007 | Garver | 235/462.46 |
| 2008/0121713 | A1 | * | 5/2008 | Steele et al. | 235/462.13 |
| 2008/0128512 | A1 | * | 6/2008 | Schmidt et al. | 235/462.46 |

FOREIGN PATENT DOCUMENTS

JP 2006-309412 * 9/2006 .............. G06K 7/10

* cited by examiner

*Primary Examiner* — Daniel Hess
(74) *Attorney, Agent, or Firm* — Howard & Howard Attorneys PLLC (57) ABSTRACT

A computer-implemented process for a customer to scan items for purchase and proceed to a rapid checkout can be operated within a processor of a portable computerized device. The process includes monitoring a scan of an item to be purchased, the scan comprising an image captured by a camera device of the portable computerized device, commanding deactivation of the camera device after execution of the scan, monitoring an indication by a user of the portable computerized device that an item is to be scanned, and commanding activation of the camera device based upon the monitored activation.

13 Claims, 8 Drawing Sheets

CAMERA TIME OUT FEATURE FOR CUSTOMER PRODUCT SCANNING DEVICE

BACKGROUND INFORMATION

1. Field of the Disclosure

The present disclosure relates generally to a computer implemented process to allow customers to use a portable computerized device to scan goods in a store and allow them to purchase the item. In particular, examples of the present disclosure are related to maximizing efficiency of the computer implemented process to prolong battery life of a portable computerized device.

2. Background

Portable computerized devices permit a user to collect and process data from surroundings. A portable computerized device can include a camera device configured to capture an image or a series of images which can collectively be defined as a video feed. Programming upon or accessible by the device can process the image or images to identify useful information. The device can include wireless communication to acquire or send information to a remote server device. A device can additionally or alternatively include a microphone to record audio.

A portable computerized device can include software applications that capture product barcodes, QR codes, images of packaging details, or other identifying marks, and by matching these marks to those in a centralized database, identify the product so that it can then be later used.

BRIEF DESCRIPTION OF THE DRAWINGS

Non-limiting and non-exhaustive embodiments of the present disclosure are described with reference to the following figures, wherein like reference numerals refer to like parts throughout the various views unless otherwise specified.

Corresponding reference characters indicate corresponding components throughout the several views of the drawings. Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments of the present disclosure. Also, common but well-understood elements that are useful or necessary in a commercially feasible embodiment are often not depicted in order to facilitate a less obstructed view of these various embodiments of the present disclosure.

Detailed Description

In the following description, numerous specific details are set forth in order to provide a thorough understanding of the present disclosure. It will be apparent, however, to one having ordinary skill in the art that the specific detail need not be employed to practice the present disclosure. In other instances, well-known materials or processes have not been described in detail in order to avoid obscuring the present disclosure.

Reference throughout this specification to "one embodiment", "an embodiment", "one example" or "an example" means that a particular feature, structure or characteristic described in connection with the embodiment or example is included in at least one embodiment of the present disclosure. Thus, appearances of the phrases "in one embodiment", "in an embodiment", "one example" or "an example" in various places throughout this specification are not necessarily all referring to the same embodiment or example. Furthermore, the particular features, structures or characteristics may be combined in any suitable combinations and/or sub-combinations in one or more embodiments or examples. In addition, it is appreciated that the figures provided herewith are for explanation purposes to persons ordinarily skilled in the art and that the drawings are not necessarily drawn to scale.

An individual wishing to achieve a faster shopping experience by skipping the check-out line. In one exemplary embodiment, a shopped can use a portable computerized device, such as a smart phone, a tablet computer, or glasses configured to project images in a view of the user, and more particularly, a camera device equipped to the device, to scan items for purchase. These scanned items can be added to an electronic billing statement, the items can be placed in the shopping cart, and a rapid or abbreviated checkout process can be utilized to permit the shopper to pay and go. Such an abbreviated checkout process can include summarily or briefly inspecting the items in the cart, weighing the cart, or other processes to briefly confirm accuracy of the scanning process.

Such a process, wherein the shopper uses a portable device to scan items for purchase, can be an intensive drain on the battery power of the device. In particular, operation of a camera device draws a significant amount of battery power. An exemplary shopping trip can include an hour in a store. If the device has its camera device activated throughout the entire hour, the battery can become significantly depleted, or the device may run out of power before the shopping trip is completed. A process to operate a portable computerized device to scan items in a retail store can include operating the camera device in an inactive state while a customer walks through the store and activating the camera device only when the customer indicates that a product is to be scanned.

While the camera device is inactive, the display of the portable computerized device can also be inactivated to save additional battery power. In another embodiment, the display of the portable computerized device can display a running total of the electronic billing statement generated so far by the items scanned so far. In another embodiment, the display of the portable computerized device can display details of the items scanned so far, for example, in comparison to an entered shopping list. In another embodiment, the display of the portable computerized device can display advertisements, display details of special displays or offers provided throughout the store, or display a map of the store.

As camera usage and scanning are computationally expensive and therefore drain battery power quickly, after the product is successfully scanned the portable computerized device can switch from the active camera display to the customer's virtual shopping cart, thus saving as much battery power as possible. Additionally, if the camera is active for a specific period of time and fails to recognize a pattern that can be converted into machine readable code, the camera can time out switching back to the customer's virtual shopping cart. For example, if a customer scans an item, then forgets to exit the camera function within the scanning application on their portable computerized device and places the portable computerized device in their pocket, the scanning application will wait a short but specific period of time. If, after this specific period of time, the scanning application does not detect a recognizable pattern, the scanning application will then exit the camera functionality and take the customer back to their virtual shopping cart. From the virtual shopping cart, the customer will have the option to scan other products, among other options.

In another embodiment, when the customer scans a product, in addition to adding that product to their virtual shopping cart, the customer has the option to save products for later in a personal shopping database, allowing for later retrieval when the customer returns. This circumvents the entire need to activate the camera for further scanning, thus saving battery power. Additionally, the shopper's entire shopping history can be saved in their personal shopping profile, allowing the customer to quickly add commonly purchased items to their shopping cart without the need to activate the camera.

A personal shopping profile for an individual can be stored within a server device for access by the individual or by others permitted to access the list by the individual. The personal shopping profile can be established by any number of means. In one embodiment, the personal shopping profile can be established by the customer scanning individual products and choosing to add the product to their profile or not. After the portable computerized device recognizes a pattern, converts it to machine readable code, communicates with a server, and the server returns human readable code, the customer could be prompted to either dismiss the scanned item, add the item to their virtual shopping cart, save the item for later purchase, or some combination thereof. In another embodiment, the customer's personal shopping profile could be comprised of the customer's entire shopping history. For example, any product that a customer has previously purchased or scanned, could be saved for later and stored in their personal shopping preferences, making retrieval at a later date much easier. In this embodiment, the customer could even create a "favorites" list, allowing the customer to identify commonly purchased items such as milk, sugar, or other common items. In another embodiment, an application could monitor local weather forecasts and alert the customer as to seasonal changes that might alter their shopping decisions, even making suggestions to the customer regarding products they might need based on their purchasing history and upcoming weather events. These examples focus on processes that allow the customer to use the portable computerized device to add products to their virtual shopping cart without the need to engage the camera or other computationally intense sensing processes, thus using as little battery as possible.

If a customer wishes to share preferences and user profiles, the personal shopping profile of the customer could be shared with specific members of the family or friends. For example, if a husband is shopping for his wife, she could share aspects of her personal shopping profile with him. In one embodiment, if the wife had need for a specific product, she could access the husband' personal shopping profile add the product to an electronic shopping list. In this example, as the husband finds the particular product desired, he can simply indicate to the device that the desired items is being added to the cart, thus saving potential battery power. Hardware and software configurations of the systems disclosed herein can take many different embodiments. In one embodiment, a single personal shopping profile index server can be utilized remotely to provide personal shopping profiles in a plurality of stores, with communication of necessary information being transferred over a communications network. In another embodiment, a single remotely operated personal shopping profile index server can be used to provide personal shopping profiles for a single store. In one embodiment, a remote server can be used as a store personal shopping profiles index server, and a second, local, in-store server can be used to permit local wireless communication between customers and the local server. In another embodiment, a store personal shopping profile index server can be local to a store. Communication between portable computerized devices and a store product index server can be over a cellular network, over a local network operated by the store, or by other communications processes known in the art.

An inactive camera device can be reactivated by a customer indicating that he or she intends to scan another product. Such an indication can be an overt act by the shopper, for example, requiring the shopped to touch a "SCAN NOW" button on the display of the device. Such an indication can be implied by behavior of the shopper and sensed motion and/or location of the device. For example, a portable computerized device can include an accelerometer that can monitor motion and an orientation of the device. A shopper can have a tendency to use the device in a "normal" orientation when seeking to scan an item. A shopper seeking to scan a product with a hand-held device is likely to hold the device in an orientation wherein the device is roughly held in an up and down orientation, sometimes with an incline wherein the display screen is canted upward for viewing by the shopper, but with the bottom and top surfaces of the device roughly parallel to the ground. In addition, the user may hold the device in that orientation without significant movement during an intended scan. A device can be activated based upon an indication that the shopper wants to scan an item by sensing the device going from an uncontrolled orientation to a "normal" orientation and having that orientation held for a second or two threshold time. In another example, by determining motion of the device, an indication to scan an item can be inferred or ruled out. A shopper is likely to stop walking to scan a product. For example, if the device is in motion and swinging slightly, for example, as would be consistent with a shopper walking with the device either in hand or in a pocket, the device can infer than no scan is intended because the shopper is still clearly in motion. In another example, there are areas in a store whereat scanning is unlikely, for example, in a busy aisle-way, stopped outside the restrooms, or stopped at an in-store restaurant. The device can infer from a determined location in the store that no scan is intended based upon the current area no including items to be scanned. Any of the above indications or prohibitions on scanning can be overridden, for example, by activation of a "SCAN NOW" button or by changing user preferences in a device setup menu.

An expedited check out experience could be used by customers who have a personalized shopping profile. The expedited check out experience could include the use of a dedicated self-checkout station. For example, once a customer has completed their shopping, they could proceed to a dedicated check-out line. The customer could then select a payment process such as credit card or cash, pay for their purchases, and complete the transaction. In another embodiment, the customer could have a mobile or web-based payment option. In one example, the portable computerized device could have an pre-registered option to pay for the purchases and the store could use automated product/cart content verification processes, avoiding any need for the shopper to get in a check-out line entirely.

Figure 1:
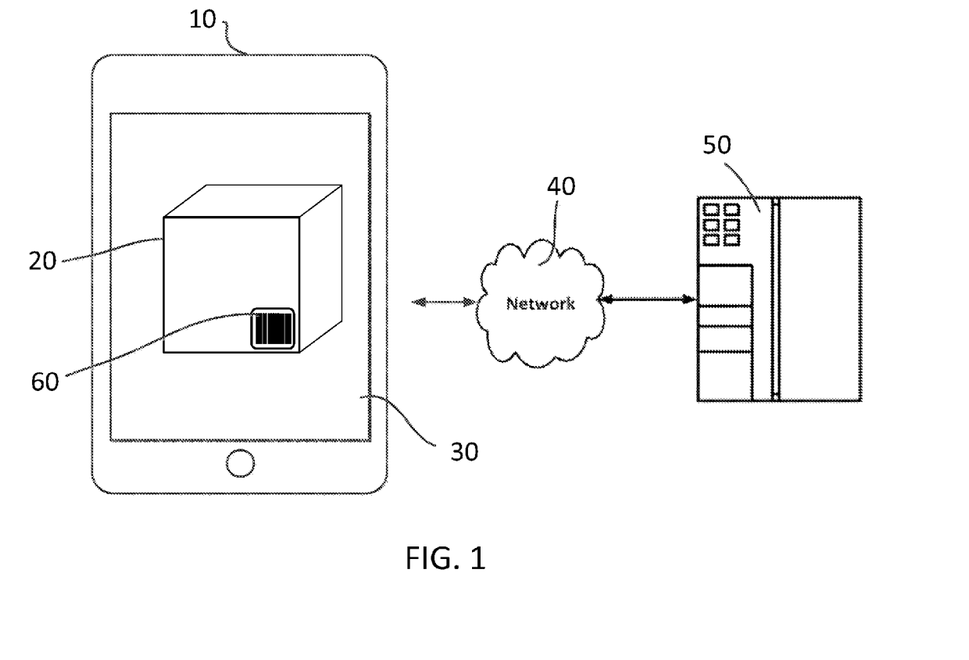
FIG. 1 is a schematic drawing illustrating an exemplary portable computerized device in communication with an exemplary store product index server, according to some embodiments of the disclosure.

To illustrate, FIG. 1 is a schematic drawing illustrating an exemplary portable computerized device in communication with an exemplary store product index server. Portable computerized device 10 is illustrated, including a display projecting view 30 based upon a camera device installed to device 10. Included within view 30 is product 20 with universal product code (UPC) symbol 60. Device 10 is an exemplary portable computerized device including input devices configured to gather information and a processor configured to make determinations regarding data from the input devices. Store product index server 50 is illustrated including a remote computerized system with modules operating to share information gathered from device 10 with other possible servers in a network as discussed herein. Server 50 and device 10 are in communication through exemplary wireless communications network 40.

Portable computerized device 10 can include a number of exemplary devices, including a smart phone, a tablet computer, processor-equipped glasses configured to project graphics upon a view the wearer, or any other similar device known in the art.

Figure 2:
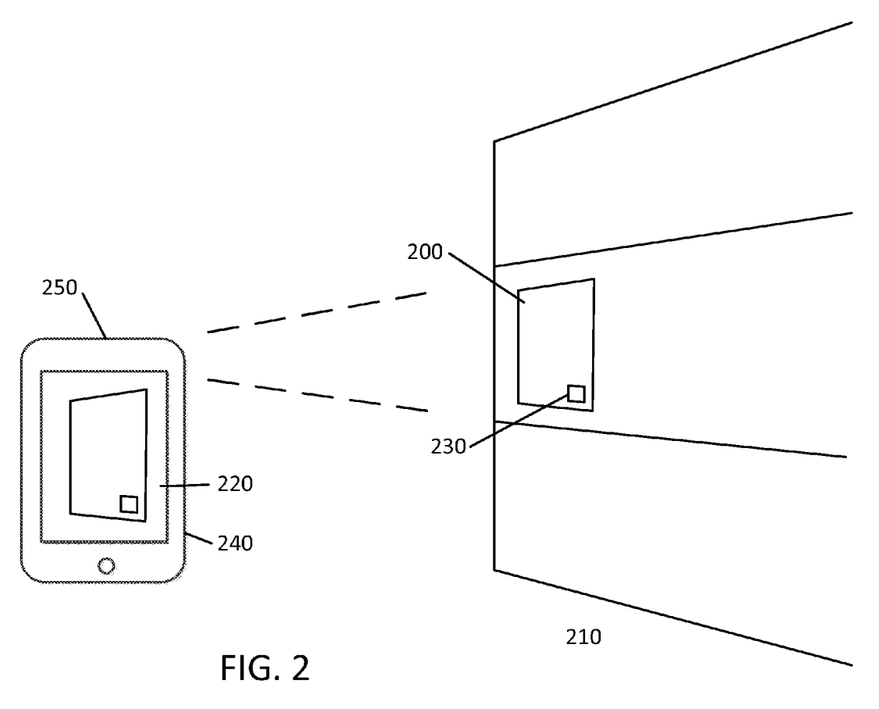
FIG. 2 is an exemplary view of a shelf of products in a retail store including a product of interest being shown on a shelf and a portable computerized device monitoring a video feed for recognizable patterns, according to some embodiments of the disclosure.

FIG. 2 is an exemplary view of a shelf of products in a retail store including a product of interest being shown on a shelf and a portable computerized device monitoring a video feed for recognizable patterns. Product 200 includes a sticker, printed graphic or other display of a UPC symbol 230 on its exterior. In an alternative embodiment, a UPC barcode or a 2D or 3D barcode, such as a QR code, can be displayed upon the product, on a tag in a shelf holding the product, or on a purchasing slip presented for the product. View 220 can illustrate objects visible on a video feed projected upon a portable computerized device 240. Store shelves 210 are visible in the view, as are products upon the shelves. Further view 220 can include graphics projected upon the view of the individual using the device. Rear facing camera 250 can monitor a video feed for a recognizable pattern, such as UPC code 230. A scan be executed based upon any readable barcode being visible in the view of the device. If more than one code is available to scan, the device can take a dominant code, for example, closest to the center of the display or the device can signal to the user that conditions are too ambiguous to execute a scan. Scanning of an item can require that the code to be scanned fill most of a view captured by the camera device. In another embodiment, the user can be presented with a reticle or graphic indicating a region of the display that the user should put the code to be scanned within for the scan to execute.

Figure 3:
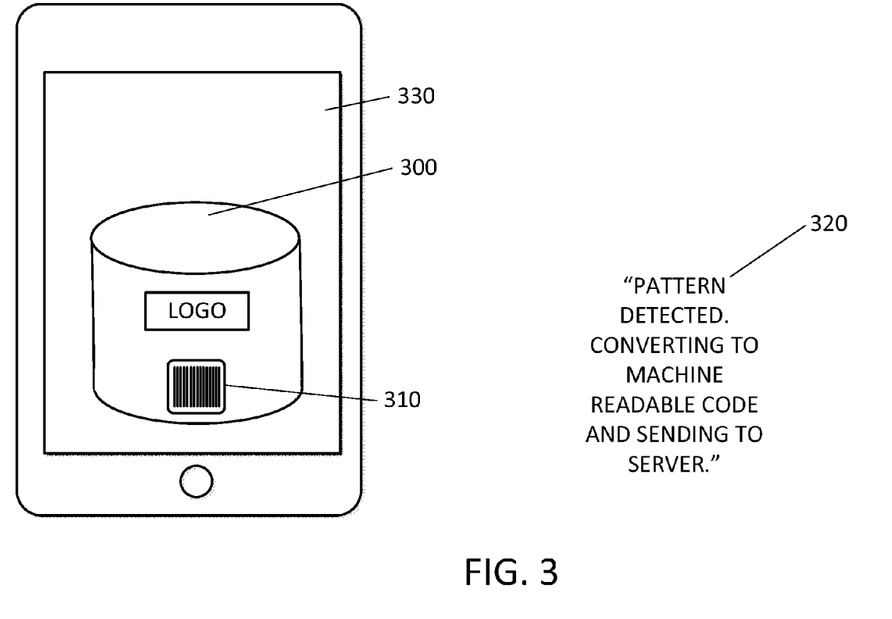
FIG. 3 is an exemplary view of a portable computerized device identifying a recognizable pattern on a product and converting that information to machine readable code, according to some embodiments of the disclosure.

FIG. 3 is an exemplary view of a portable computerized device identifying a recognizable pattern on a product and converting that information to machine readable code. View 330 includes a product 300 located within a retail store. Through processes disclosed herein, the product can be identified within the store product index server using UPC symbol 310. Device 330 can then convert the graphic image into machine readable code, displaying message 320. The device can provide a positive feedback to the customer that a scan has been executed. Such feedback can be graphical, for example, blinking or flashing the display upon a successful scan or displaying text confirming the identity of the scanned item. In another example, an audio form of feedback can be given, for example, including a beep or a short musical clip. In FIG. 3, a recorded verbal audio feedback message 320 is illustrated, played by a speaker on the device.

Figure 4:
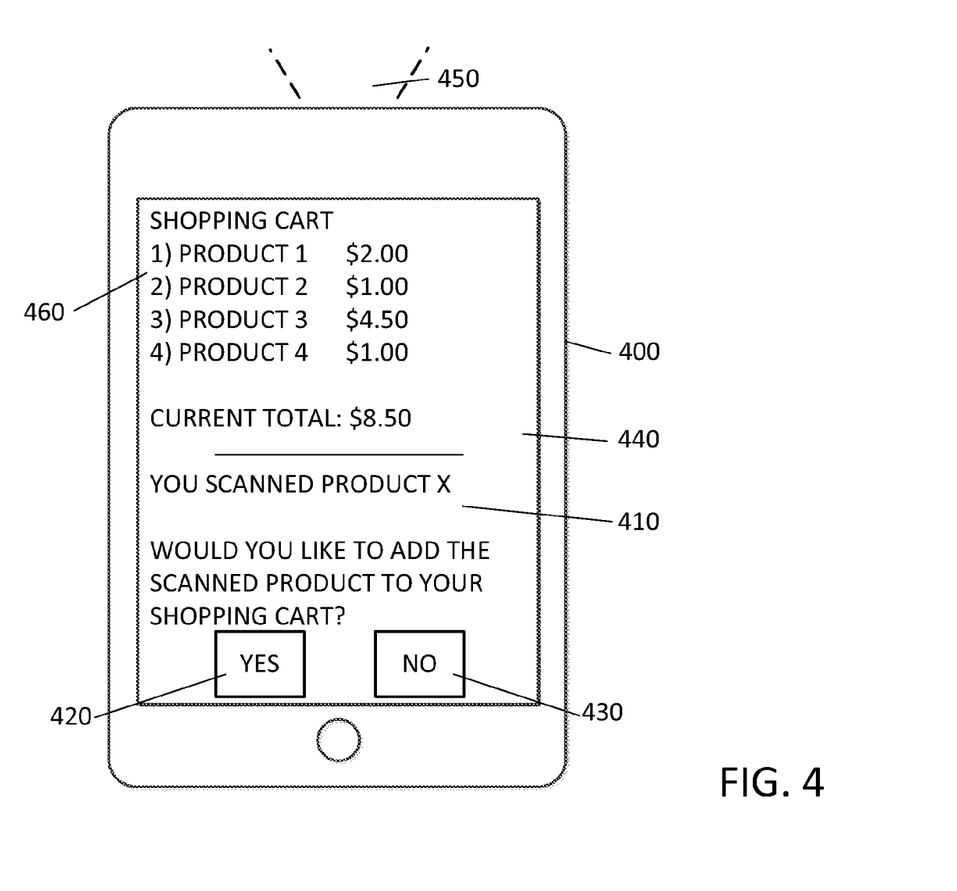
FIG. 4 is an exemplary view of a portable computerized device requesting feedback from a user regarding a scanned product and information received from a server regarding the scanned product, according to some embodiments of the disclosure.

FIG. 4 is an exemplary view of a portable computerized device displaying the human readable code it receives from a server and a prompt for the viewer to add the product to their virtual shopping cart. Portable computerized device 400 includes a display 440. Display 440 includes details of a current electronic billing statement 460, detailing products scanned so far by the shopper, and a textual message 410 returned from a server and prompting the viewer to confirm whether the scanned product should be added to a virtual shopping cart. Included are inputs 420 and 430 permitting the user to confirm or reject, respectively, the scanned product for placement in their virtual shopping cart. Device 400 additionally includes a camera device capturing view 450 on the rear of the device.

Figure 5:
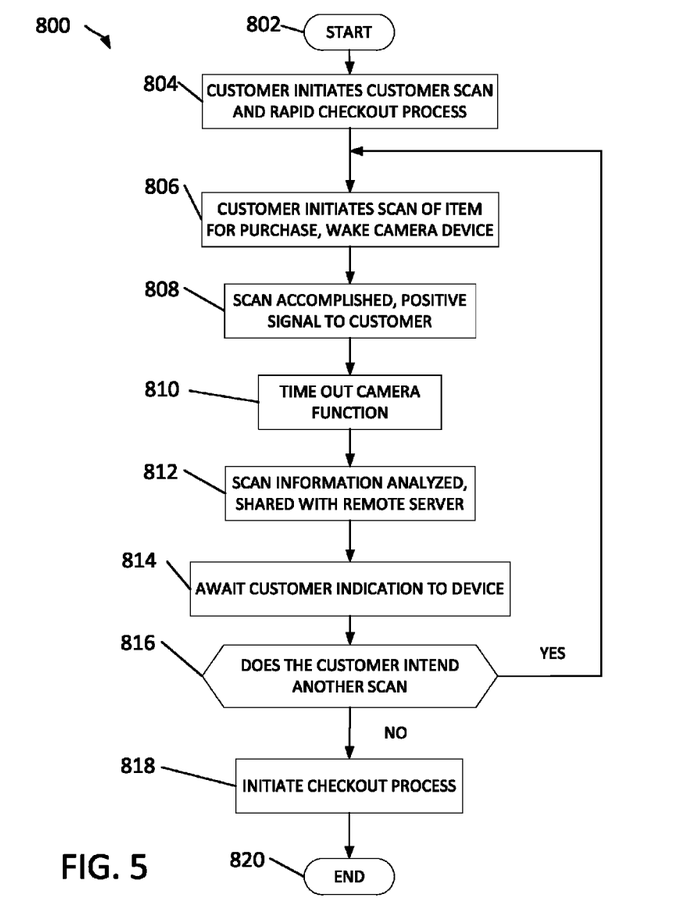
FIG. 5 is illustrates a flowchart demonstrating an exemplary process to deactivate and again activate a camera device for use in scanning items within a retail store, according to some embodiments of the disclosure.

FIG. 5 is illustrates a flowchart demonstrating an exemplary process to deactivate and again activate a camera device for use in scanning items within a retail store. Process 800 begins at step 802. At step 804, the customer initiates a customer scan and rapid checkout process, for example, by activating an executable application on a smart phone device. At step 806, the customer initiates scan of an item for purchase, for example, indicating that a scan is desired according to processes disclosed herein, and the camera device of the smart phone is activated. At step 808, the scan of the item to be purchased is accomplished and a positive feedback signal is provided to the customer confirming that the scan was accomplished. The customer can, after the scan is accomplished, place the item to be purchased in a shopping cart. At step 810, the camera device is transitioned to an inactive state in order to save battery power, for example according to a time out procedure some time duration after the scan was accomplished. At step 812, the scan information is analyzed and shared with a remote server, for example, to identify a product associated with the scanned information, so that an electronic billing statement can be updated to include the scanned item. At step 814, the process awaits for the customer to indicate to the device. Such an indicate can be overt or inferred, as disclosed herein. Upon indication to the device, at step 816, a determination can be made whether the customer intends to scan another item for purchase or if the customer intends to initiate a checkout process. If the customer intends to scan another product, then the process returns to step 806. If the customer intends to initiate a checkout process, the process advances to step 818, wherein the checkout process is initiated, and then the process ends at step 820. Process 800 is provided as an example to operate procedures and operations disclosed herein, however, a number of exemplary processes are envisioned, and the disclosure is not intended to be limited to the particular examples provided herein.

The flowchart and block diagrams in the flow diagrams illustrate the architecture, functionality, and operation of possible implementations of systems, processes, and computer program products according to various embodiments of the present disclosure. In this regard, each block in the flowchart or block diagrams may represent a module, segment, or portion of code, which comprises one or more executable instructions for implementing the specified logical function(s). It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions. These computer program instructions may also be stored in a computer-readable medium that can direct a computer or other programmable data processing device to function in a particular manner, such that the instructions stored in the computer-readable medium produce an article of manufacture including instruction means which implement the function/act specified in the flowchart and/or block diagram block or blocks.

Figure 6:
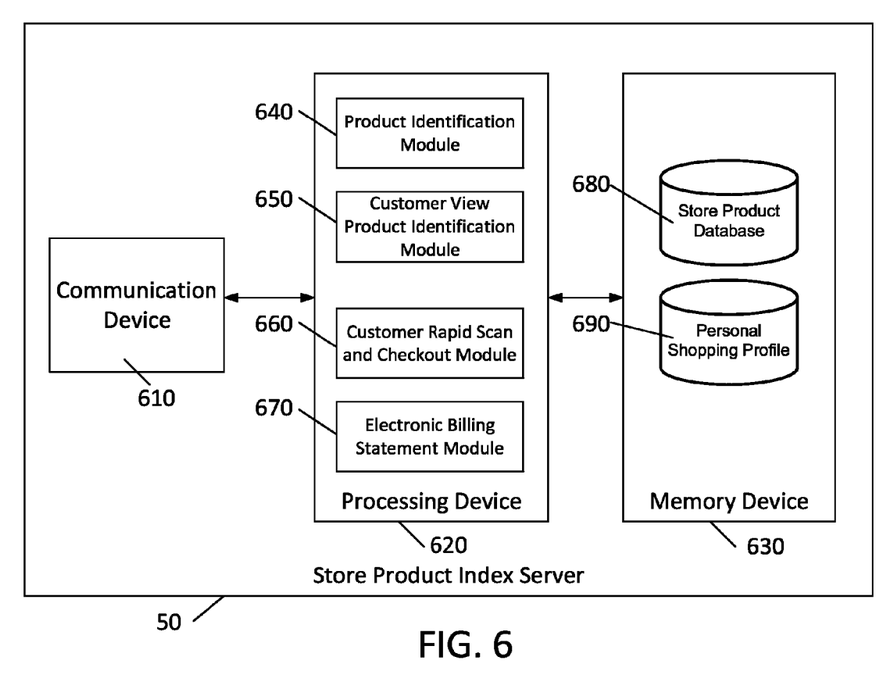
FIG. 6 is a schematic illustrating an exemplary store product index server, according to some embodiments of the disclosure.

FIG. 6 is a schematic illustrating an exemplary store product index server, according to some embodiment of the disclosure. In the illustrated embodiment, the store product index server 50 may include a processing device 620, a communication device 610, and memory device 630.

The processing device 620 can include memory, e.g., read only memory (ROM) and random access memory (RAM), storing processor-executable instructions and one or more processors that execute the processor-executable instructions. In embodiments where the processing device 620 includes two or more processors, the processors can operate in a parallel or distributed manner. In the illustrative embodiment, the processing device 620 executes one or more of a product identification module 640, a customer view product identification module 650, a customer rapid scan and checkout module 660, and an electronic billing statement module 670.

The communication device 610 is a device that allows the store product index server 50 to communicate with another device, e.g., a portable computerized device through a wireless communication network connection. The communication device 610 can include one or more wireless transceivers for performing wireless communication and/or one or more communication ports for performing wired communication.

The memory device 630 is a device that stores data generated or received by the store product index server 50. The memory device 630 can include, but is not limited to a hard disc drive, an optical disc drive, and/or a flash memory drive. Further, the memory device 630 may be distributed and located at multiple locations. The memory device 630 is accessible to the processing device 620. In some embodiments, the memory device 630 includes a store product database 680 and a personal shopping profile 690.

In some embodiments, the store product database 680 stores information about a product, including weight, size, cost, and other information regarding the product. The store product database 680 may further store other information about a particular product, including price, weight, availability, and similarity of the product to other available products.

Personal shopping profile 690 can be used to store information about a particular customer, for example, within a registered account that can be linked to a customer's phone number or email address. As disclosed herein, shopping history can be used to permit a shopper to state that he or she is buying and presently putting the same gallon of 2% milk in the cart that the shopper buys every week. Items that are not scanned but instead manually selected by the customer can be flagged on a checkout list provided to store employees, so that the store employee can know particularly to visually confirm presence of the correct gallon of milk to match the manual entry by the shopper. By permitting the shopper to select items from historical shopping trips or from a list of favorite items, the battery power of the portable computerized device of the user can be conserved.

The product identification module 640 can monitor or receive information about a product that has been scanned and reference the store product database 680 to determine, based upon a scanned image like a UPC symbol, the cost of the product. Electronic billing statement module 670 can manage information related to the identified product such as cost and can manage a pending virtual shopping cart for output to a portable computerized device.

Customer rapid scan and checkout module 660 can include programming to coordinate operation of the process disclosed herein for a customer to scan items for purchase and enable for rapid checkout of the items. In one embodiment, module 660 can communicate the electronic billing statement maintained by module 670 to a store operated server or to point-of-sale stations located in a rapid checkout area.

Figure 7:
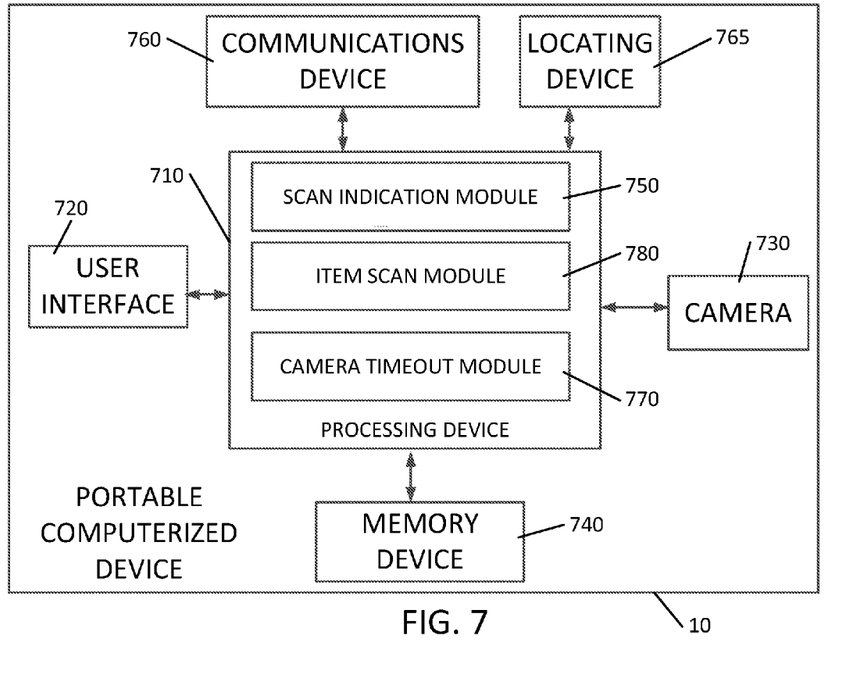
FIG. 7 is a schematic illustrating an exemplary portable computerized device configured to implement processes disclosed herein, according to some embodiments of the disclosure.

FIG. 7 is a schematic illustrating an exemplary portable computerized device configured to implement processes disclosed herein, according to some embodiment of the discloser. Device 10 includes a processing device 710, a user interface 720, a communication device 760, a locating device 765, a camera 730, and a memory device 740.

The processing device 710 can include memory, e.g., read only memory (ROM) and random access memory (RAM), storing processor-executable memory (ROM) and random access memory (RAM), storing processor-executable instructions and one or more processors that execute the processor-executable instructions. In embodiments where the processing device 710 includes two or more processors, the processors can operate in a parallel or distributed manner. In the illustrative embodiment, the processing device 710 can execute the operating system of the portable computerized device. In the illustrative embodiment, the processing device 710 also executes an item scan module 780, a scan indication module 750, and a camera timeout module 770, which are described in greater detail below.

The user interface 720 is a device that allows a user to interact with the portable computerized device. While one user interface 720 is shown, the term "user interface" can include, but is not limited to, a touch screen, a physical keyboard, a mouse, a microphone, and/or a speaker. The communication device 760 is a device that allows the portable computerized device to communicate with another device, e.g., a store product index server. The communication device 760 can include one or more wireless transceivers for performing wireless communication and/or one or more communication ports for performing wired communication. The memory device 740 is a device that stores data generated or received by the portable computerized device. The memory device 740 can include, but is not limited to, a hard disc drive, an optical disc drive, and/or a flash memory drive.

The camera 730 is a digital camera that captures a digital photograph or a video clip embodied as a series of images. The camera 730 receives an instruction to capture an image and captures an image of a view proximate to the camera. The digital photograph or images captured by the camber can be a bitmap file. The bitmap file can be a bitmap, a JPEG, a GIF, or any other suitably formatted file. The camera 730 can receive the instruction to capture the image from the processing device 710 and can output the digital photograph to the processing device 710.

Locating device 765 includes sensors and programming configured to locate the device. In one embodiment, locating device 765 can use a plurality of signals from local cell phone towers to accurately triangulate a position of the device. In one embodiment, locating device 765 can further access or otherwise enable overlaying a present position of the device with a store map such that information related to the device being in a particular part of a retail store can be used. The cell phone signals can further be used to determine an orientation of the phone, for example, enabling the determination that the user is indicating a desired scan event to the device, as disclosed herein. Locating device 765 can further include an accelerometer or accelerometers to further enable determination of a position, orientation, or relative motion of the device.

Item scan module 780 monitors images captured by camera 730 and/or other inputs that can be used to indicate to a product. Item module 780, upon monitoring an indication to a product, can image recognition, barcode recognition, or other processes to index the product. Information gathered by product capture module can be communicated to the product store index server to particularly identify the product according to the processes disclosed herein.

Scan indication module 750 can include programming to determine when a customer intends to scan a product. Module 750 can include programming to command display of a "SCAN NOW" button to the customer and monitor activation of the button. Module 750 can also monitor other factors to determine whether inputs/the user's use of the phone indicates that a scan of an item to be purchases is desired or indicated. As disclosed herein, holding of a device in an upright position and holding the device steady for a period can indicate an intent of the user to scan. In another embodiment, continued motion of the device, indicative of walking, followed by a sustained pause, possibly indicating the user stopping at a product, can be used to indicate a intent of the user to scan a product. A number of different factors for determining or indicating an intent of the user to scan a product for purchase are envisioned, and the disclosure is not intended to be limited to the particular exemplary embodiments provided herein.

Camera timeout module 770 can include programming to selectively activate and deactivate camera device 730. According to processes disclosed herein, a scan can be performed, the camera can be deactivated after the scan, and an indication by the user indicating an intent to scan can be monitored and used to selectively control the camera device 730. Camera timeout module 770 can further include programming to present a button to the user permitting the user to manually turn the camera device 730 on or off.

Embodiments in accordance with the present disclosure may be embodied as an device, process, or computer program product. Accordingly, the present disclosure may take the form of an entirely hardware embodiment, an entirely software embodiment (including firmware, resident software, micro-code, etc.), or an embodiment combining software and hardware aspects that may all generally be referred to herein as a "module" or "system." Furthermore, the present disclosure may take the form of a computer program product embodied any tangible medium of expression having computer-usable program code embodied in the medium.

Any combination of one or more computer-usable or computer-readable media may be utilized. For example, a computer-readable medium may include one or more of a portable computer diskette, a hard disk, a random access memory (RAM) device, a read-only memory (ROM) device, an erasable programmable read-only memory (EPROM or Flash memory) device, a portable compact disc read-only memory (CDROM), an optical storage device, and a magnetic storage device. Computer program code for carrying out operations of the present disclosure may be written in any combination of one or more programming languages.

Embodiments may also be implemented in cloud computing environments. In this description and the following claims, "cloud computing" may be defined as a model for enabling ubiquitous, convenient, on-demand network access to a shared pool of configurable computing resources (e.g., networks, servers, storage, applications, and services) that can be rapidly provisioned via virtualization and released with minimal management effort or service provider interaction, and then scaled accordingly. A cloud model can be composed of various characteristics (e.g., on-demand self-service, broad network access, resource pooling, rapid elasticity, measured service, etc.), service models (e.g., Software as a Service ("SaaS"), Platform as a Service ("PaaS"), Infrastructure as a Service ("IaaS"), and deployment models (e.g., private cloud, community cloud, public cloud, hybrid cloud, etc.).

Figure 8:
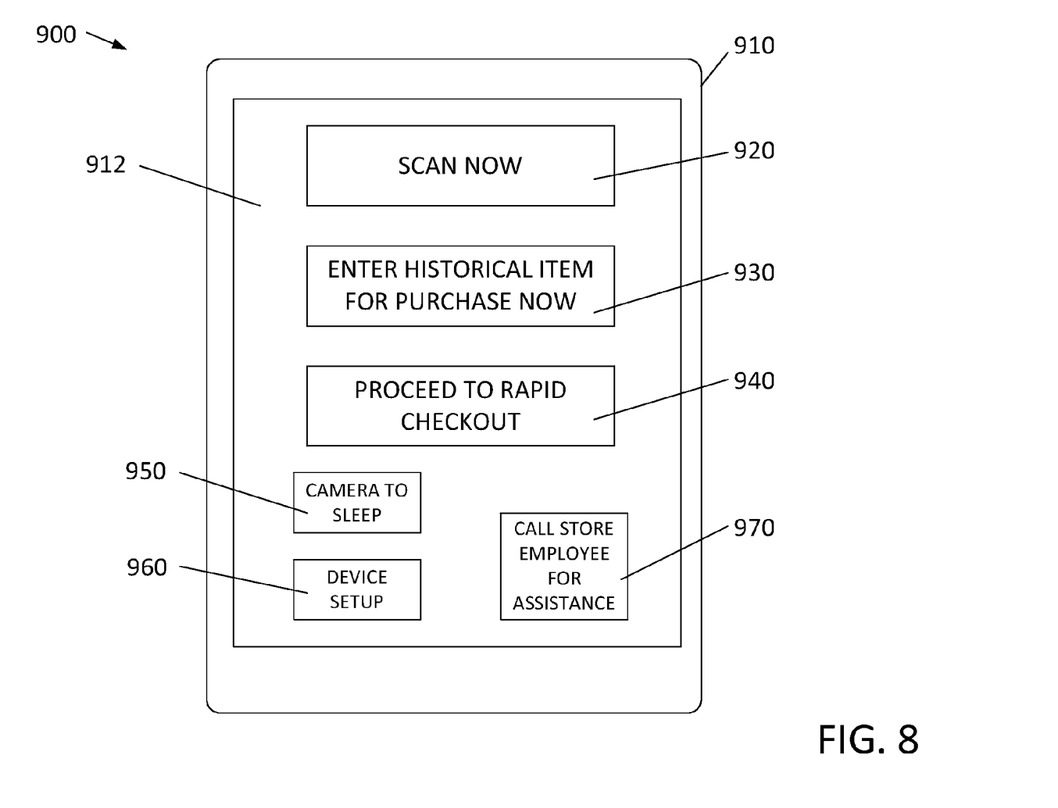
FIG. 8 schematically illustrates an exemplary tablet computer presenting a plurality of options to a user related to scanning processes disclosed herein, according to some embodiments of the disclosure.

FIG. 8 schematically illustrates an exemplary tablet computer presenting a plurality of options to a user related to scanning processes disclosed herein. Configuration 900 includes a portable computerized device embodied as tablet computer 910. Tablet computer 910 includes display 912 displaying a plurality of graphically displayed buttons for selection by a user. Button 920 permits the user to command the device to scan now or capture an image in order to scan a barcode of an item likely to contained within the image. Button 930 permits the user to access historical or favorite items and indicate that a selected item is currently being placed in the shopping cart, thereby saving the battery power that would have been required to scan the product. Button 940 permits the user to command the device to initiate the process to checkout. Activation of button 940 can be used to disable the camera device. In another embodiment, the camera device can remain active despite activation of button 940 in hopes that the shopper will make a further impulse purchase in the way to the checkout station. Button 950 permits the user to command the camera device to enter a deactivated state, thereby saving battery power. Button 960 permits the user to enter a device setup mode, for example, permitting the user to enter preferences regarding when the camera device is activated and items that appear on a favorites list for manual entry. Button 970 permits the user to call a store employee for help, for example, permitting the user to ask the employee for help with an oversized product or a product that does not have a barcode visible to the user.

Modules and programming are disclosed herein in relation to exemplary device 10 and server 50. These modules and the associated programming are provided as an example of how the processes may be operated on the disclosed hardware. These examples are provided as non-limiting examples, and the modules and programming can be divided between the hardware in different arrangements without affecting operation of the processes disclosed herein.

Processes are disclosed herein for the purpose of saving battery power in a portable computerized device used to scan items in a retail store. Such processes can be used during all shopping events. In another embodiment, the device can monitor a current state of charge of the battery of the device, and the processes disclosed herein can be utilized only when the state of charge of the battery is determined or estimated to be less than some threshold level, for example, fifty percent. In another embodiment, a command to deactivate the camera device can be prevented for a period, for example, a period of two minutes, based upon the user scanning a plurality of items in quick succession, for example, at least three items over a fifteen second period. In this way, any delay associated with reactivation of the camera can be avoided where the user is scanning a large number of items in a row.

Portable computerized devices can include a light sensor, for example, for the purpose of automatically correcting contrast on the screen of the device. According to one embodiment, assuming that darkness indicates that the device is in a shopper's pocket, the camera device can be deactivated or prevented from being activated based upon a light sensor indicating that the device is in a dark environment.

The above description of illustrated examples of the present disclosure, including what is described in the Abstract, are not intended to be exhaustive or to be limitation to the precise forms disclosed. While specific embodiments of, and examples for, the disclosure are described herein for illustrative purposes, various equivalent modifications are possible without departing from the broader spirit and scope of the present disclosure. Indeed, it is appreciated that the specific example voltages, currents, frequencies, power range values, times, etc., are provided for explanation purposes and that other values may also be employed in other embodiments and examples in accordance with the teachings of the present disclosure.

What is claimed is:

1. A computer-implemented process for a customer to scan items for purchase and proceed to a rapid checkout, the process comprising:
    within a processor of a portable computerized device,
        executing a scan of a first item to be purchased, the scan comprising an image captured by a camera device of the portable computerized device;
    after execution of the scan, commanding deactivation of the camera device;
        after commanding deactivation, inferring that no scan is intended by the user based upon a monitored location of the portable computerized device within the retail store;
    preventing activation of the camera device based upon the inferring that no scan is intended;
        after preventing activation, receiving an indication from a user of the portable computerized device that a second item is to be scanned; and
    commanding activation of the camera device based upon the receiving the indication.

2. The computer-implemented process of claim 1, wherein receiving the indication comprises receiving, from the user, a command that a scan be executed.

3. The computer-implemented process of claim 1 wherein receiving the indication comprises inferring the indication based upon an orientation of the portable computerized device.

4. The computer-implemented process of claim 1, wherein receiving the indication comprises inferring the indication based upon the user holding the portable computerized device in a normal orientation through a threshold duration of time, wherein the normal orientation includes both a top edge and a bottom edge of the portable computerized device being parallel to ground.

5. The computer-implemented process of claim 1, wherein receiving the indication comprises:
    monitoring the portable computerized device undergoing motion indicative of the user walking; and
    determining the indication by the user based upon the portable computerized device being held still through a threshold period of time.

6. A computer-implemented method for scanning items for purchase, the method comprising:
    within a processor of a portable computerized device being carried by a human customer,
        executing a scan of a first item to be purchased, the executing comprising capturing, via a camera device forming part of the portable computerized device, an image of a machine-readable code displayed on the first item;
    conserving electrical power stored within a battery of the portable computerized device by commanding, after the executing of the scan of the first item, deactivation of the camera device;
    monitoring, after commanding deactivation and while the camera device is deactivated, one or more signals output by a locating device;
    determining, during the monitoring based on the one or more signals, to activate the camera device absent the human customer selecting a button on the portable computerized device;
    activating, based on the determining, the camera device; and executing, after the activating, a scan of a second item to be purchased.

7. The method of claim 6, wherein the monitoring step includes the step of monitoring signals from an ambient light sensor and wherein the determining is based at least in part on the one or more signals indicating that the portable computerized device is in a lit location.

8. The method of claim 7, wherein the determining is based at least in part on the one or more signals indicating that the portable computerized device is being held such that the top and bottom edges thereof extend horizontally.

9. The method of claim 8, wherein the determining is based at least in part on the one or more signals indicating that the portable computerized device is being held still.

10. The method of claim 6, wherein the determining is based at least in part on the one or more signals indicating that the portable computerized device is being held such that the top and bottom edges thereof extend horizontally.

11. The method of claim 10, wherein the determining is based at least in part on the one or more signals indicating that the portable computerized device is being held still.

12. The method of claim 6, wherein the determining is based at least in part on the one or more signals indicating that the portable computerized device is being held still.

13. The method of claim 12, wherein the determining is based at least in part on the one or more signals indicating that the portable computerized device is in a lit location.

* * * * *